Figure 1:
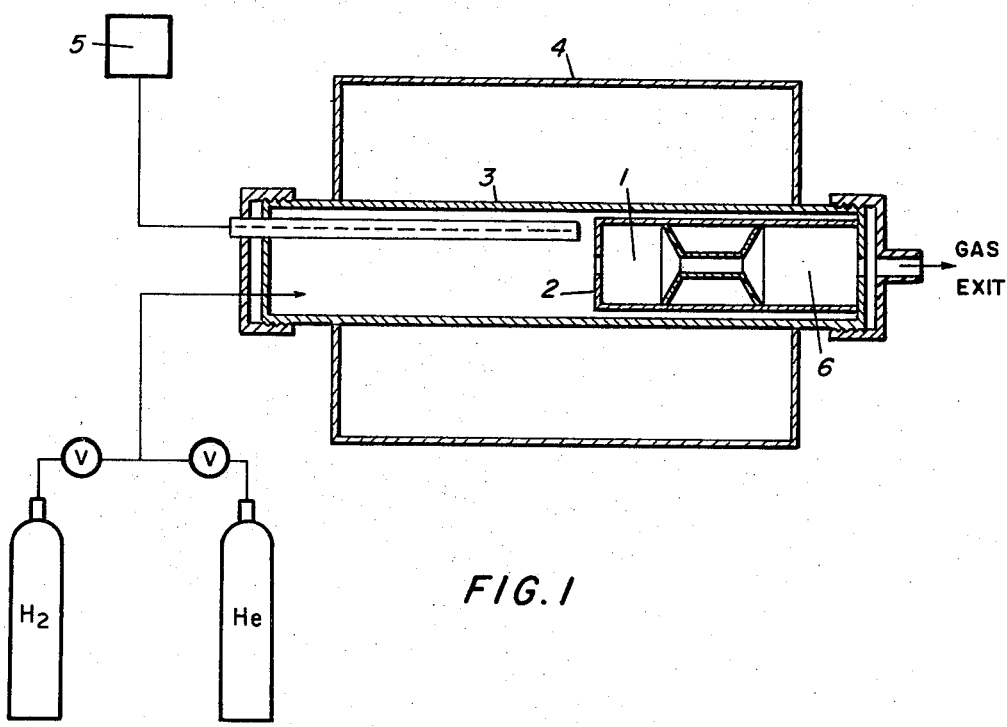

United States Patent

Waters et al.

[15] 3,653,875

[45] Apr. 4, 1972

[54] RECOVERY OF METALS AND PHOSPHATE FROM WASTE PHOSPHATE SLUDGE

[72] Inventors: Roy F. Waters; Howard E. Powell; Lee N. Ballard, all of Rolla, Mo.

[73] Assignee: The United States of America as represented by the Secretary of the Interior

[22] Filed: Mar. 2, 1971

[21] Appl. No.: 120,235

[52] U.S. Cl. .......................................... 75/21, 23/223, 75/1, 75/7, 75/97, 75/101, 75/88, 75/33

[51] Int. Cl. .................. C21b 15/00, C01b 25/00, C21b 1/00

[58] Field of Search ....................... 75/21, 9, 97, 101, 3, 6, 1, 75/7, 33, 86–88, 14; 23/223

[56] References Cited

UNITED STATES PATENTS

| 542,171 | 7/1895 | Phillips | 75/6 |
|---|---|---|---|
| 1,818,662 | 8/1931 | Weigel | 23/223 |
| 2,029,309 | 2/1936 | Curtis | 23/223 |
| 2,267,077 | 12/1941 | Burke | 23/223 |
| 2,289,277 | 7/1942 | Ritter | 23/223 |
| 2,716,591 | 8/1955 | Thomsen | 75/103 |
| 2,925,326 | 2/1960 | Pieper | 23/223 |
| 3,004,834 | 10/1961 | Harnisch | 23/223 |
| 3,146,091 | 8/1964 | Green | 75/21 |
| 3,402,041 | 9/1968 | Feld | 75/6 |
| 3,531,250 | 9/1970 | Hinz | 23/223 |

OTHER PUBLICATIONS

Treadwell & Hall, " Analytical Chemistry," Vol. I, p. 400 (1937)

*Primary Examiner*—Winston A. Douglas
*Assistant Examiner*—Peter D. Rosenberg
*Attorney*—Ernest S. Cohen and William S. Brown

[57] ABSTRACT

Waste phosphate sludge containing metals including iron and zinc are mixed with an alkali solution, and the mixture is dried and sintered at a temperature of about 500° to 1300° C. in the presence of a reductant, which may be either a reducing gas or a solid reductant. This results in conversion of the phosphate to a water-soluble salt, reduction of zinc to the metallic state and volatilization of the zinc from the reaction zone, and reduction of iron and other metallic elements to the metallic state. Leaching of the sinter cake with water recovers the soluble phosphate and frees the reduced metals for recovery in the form of fine-grained iron or iron alloy powder.

6 Claims, 2 Drawing Figures

FIG.1

Patented April 4, 1972

3,653,875

INVENTORS
ROY F. WATERS
HOWARD E. POWELL
LEE N. BALLARD

BY Ernest S. Cohen
William S. Brown
ATTORNEYS

RECOVERY OF METALS AND PHOSPHATE FROM WASTE PHOSPHATE SLUDGE

Large quantities of waste phosphate sludges are formed in industrial operations involving phosphatization of metal surfaces. For example, in automobile assembly plants a solution of monobasic zinc phosphate, phosphoric acid, and nickel or lead phosphate is used for dipping or spraying to coat the metal surfaces for the purpose of increasing corrosion resistance and paint adhesion to metal surface. Chemical reaction with the metal during the formation of the protective coating results in the accumulation of an insoluble waste containing ferric phosphate as the main ingredient.

The sludges are very fine-grained but are contaminated with varying amounts of scale or other larger-grained debris and with organic matter, including cutting oil, lubricating oil, grease, and asphaltic sealants. Partial chemical analysis of a sludge formed in treating automobile bodies (the one used in examples below) is given in the following table.

| Component | Percent |
|---|---|
| $PO_4$ | 51.0 |
| Fe | 20.0 |
| Zn | 7.5 |
| Na | 3.5 |
| Ni | 0.6 |
| Pb | 0.5 |
| Ca | 0.16 |
| Mn | 0.15 |

It has now been found, according to the invention, that iron, zinc, nickel, or other metals, as well as phosphorus, may be recovered from the sludges in commercially valuable form by means of a reduction-sinter-leach process in which the phosphorus is solubilized and the metal constituents are reduced to the metallic state.

In this process the waste phosphate sludge is initially mixed with an aqueous alkali solution, the amount and concentration of which is approximately the stoichiometric amount required to form a soluble phosphate with the phosphate contained in the sludge. Obviously, the optimum amount of alkali will depend on the specific composition of the sludge, i.e., on the amount of phosphate in the sludge. In addition, the amount of alkali need not be the exact stoichiometric amount, although a near stoichiometric amount is generally preferred for maximum recovery of phosphate, with minimum use of alkali. Furthermore, the required amount of alkali will depend on whether the mono, di or tribasic phosphate is desired as a product, the tribasic generally being preferred.

The preferred alkali for reasons of efficiency and economy is sodium hydroxide; however, other alkalis such as potassium hydroxide, sodium carbonate or potassium carbonate may also be used. Concentration and amount of alkali solution may very considerably, but concentrations of about 10 percent to 30 percent, with sludge/alkali ratios of about 1/2 to 1/0.7 are usually satisfactory.

The mixture of sludge and alkali solution is then dried at a temperature of about 150° to 250° C. for a period of about 2 to 24 hours, and is then sintered in a reducing atmosphere at a temperature of about 500° to 1300° C., preferably about 800° to 1200° C., for a period of about 15 minutes to 3 hours, preferably about 1 hour. The reducing atmosphere may be provided by any reducing gas such as hydrogen, carbon monoxide or an organic such as methane, or mixtures thereof, with hydrogen being preferred.

Under these conditions, the phosphorus contained in the sludge as metal phosphates and as phosphoric acid, is converted to water soluble phosphate; zinc is reduced to the metallic state and volatilized from the reaction vessel; and iron, together with other metallic elements present, is reduced to the metallic state.

The sinter cake is then leached with water to recover the soluble alkali phosphate and leave a residue of metallic iron or a fine-grained iron powder alloyed or mixed with other metallic constituents, e.g., nickel or lead, if present. The amount of water used for leaching is not critical, with the water/sinter cake ratio suitably being about 4/1 to 15/1.

As an alternative to the use of a gaseous reducing atmosphere, or an addition thereto, a solid reductant may be included in the initial sludge-alkali mixture to effect reduction of the metal components to the metallic state. Suitable solid reductants include coke, coal or lignite, or mixtures thereof, with coke preferred. The sludge/solid reductant ratio is suitably from about 1/2 to 1/0, the latter ratio representing the process in which a reducing gas only is used, with no solid reductant. When a solid reductant is employed, the gaseous atmosphere may be a reducing, inert or oxidizing gas, which is used to vaporize zinc, with or without entraining, and to carry the zinc from the charge as zinc metal, as zinc oxide or as a mixture of the metal and oxide.

The following examples will serve to more particularly illustrate the invention.

EXAMPLE 1

A sludge of the type described above was filtered to remove excess phosphating liquor and formed into a slurry by the addition of water in a ratio of 1 gram water to 1 gram of filtered sludge. An approximately stoichiometric quantity of NaOH (0.7 times the dry weight of the sludge) was then added as a 25 percent solution to the sludge-water slurry. The mixture was stirred for 1 hour while being heated to boiling in an open vessel, dried at 150° C. for 8–24 hours, and ground to produce a suitable charge for reduction-sintering.

Apparatus used for gaseous reduction-sinter treatment in this example is shown diagrammatically in FIG. 1. The charge is placed in the charge chamber 1 of the graphite liner 2, and the liner inserted in an Inconel pipe 3 which is surrounded by an electric tube furnace 4. As the temperature is raised, helium or other inert gas is passed over the charge. The temperature is held constant for 1 hour at 800°–900° C. by means of temperature controller 5 and hydrogen passed over the charge at atmospheric pressure at approximately 100 cm./min. linear velocity or 1,000 cc./min. After cooling, zinc is scraped from the graphite wall of condensation chamber 6. The reduction-sinter residue is removed, pulverized and wet ball milled, then leached in hot water (temperature 98° C.) and filtered.

Results are shown in Table 1. A very high-quality grade of $Na_3PO_4$ was produced; fine crystals were produced by the addition of ethyl alcohol to the leach solution. The $Na_3PO_4$ product analyzed 57.3 percent phosphate on a dry basis, the theoretical analysis being 57.9 percent phosphate. The small difference from the theoretical analysis is probably due to the presence of a minute amount of sodium hydroxide, which would not detract from the quality of the product. X-ray diffraction analysis showed that the hydrated product was $Na_3PO_4 \cdot 2O$.

EXAMPLE 2

This example was similar to that of Example 1 except that the starting material was an appliance sludge containing 21.0 percent Fe, 11.7 percent Zn and 48.2 percent $PO_4$. Results are shown in Table 2.

TABLE 1.—HYDROGEN REDUCTION, SINTER OF AUTOMOTIVE SLUDGE

| Material | Wt. pct. | Analysis, pct. | | | | | | | Distribution, pct. | | | | | | |
|---|---|---|---|---|---|---|---|---|---|---|---|---|---|---|---|
| | | Fe | Zn | Ni | Mn | Pb | $PO_4$ | Na | Fe | Zn | Ni | Mn | Pb | $PO_4$ | Na |
| Leach residue | 11.8 | 86.2 | | 3.55 | 0.51 | | | | 98.0 | 0.0 | 100.0 | 100.0 | 0.0 | 0.0 | 0.0 |
| Fumed zinc | 5.1 | 4.1 | 80.0 | | | 4.0 | 2.15 | | 2.0 | 100.0 | .0 | .0 | 100.0 | .5 | .0 |
| $Na_3PO_4 \cdot XH_2O$ | 78.8 | | | | | | 27.3 | 24.8 | .0 | .0 | .0 | .0 | .0 | 96.4 | 98.1 |
| Mother liquor | [1] 4.3 | | | | | | 16.0 | 9.0 | .0 | .0 | .0 | .0 | .0 | 3.1 | 1.9 |
| Total | 100.0 | | | | | | | | 100.0 | 100.0 | 100.0 | 100.0 | 100.0 | 100.0 | 100.0 |

[1] Estimated for solids in solution.

TABLE 2.—HYDROGEN REDUCTION, SINTER OF APPLIANCE SLUDGE

| Material | Wt. pct. | Analysis, pct. | | | | Distribution, pct. | | | |
|---|---|---|---|---|---|---|---|---|---|
| | | Fe | Zn | PO₄ | Na | Fe | Zn | PO₄ | Na |
| Leach residue | 8.2 | 92.5 | 2.9 | 0.18 | | 97.1 | 5.8 | 0.1 | 0.0 |
| Fumed zinc | 4.5 | 5.0 | 86.6 | .18 | | 2.9 | 94.2 | .0 | .0 |
| Na₃PO₄.XH₂O | 74.7 | | | 27.1 | 20.2 | .0 | .0 | 95.5 | 82.2 |
| Mother liquor | ¹12.6 | | | 7.4 | 25.9 | .0 | .0 | 4.4 | 17.8 |
| Total | 100.0 | | | | | 100.0 | 100.0 | 100.0 | 100.0 |

¹ Estimated for solids in solution.

EXAMPLE 3

Figure 2:
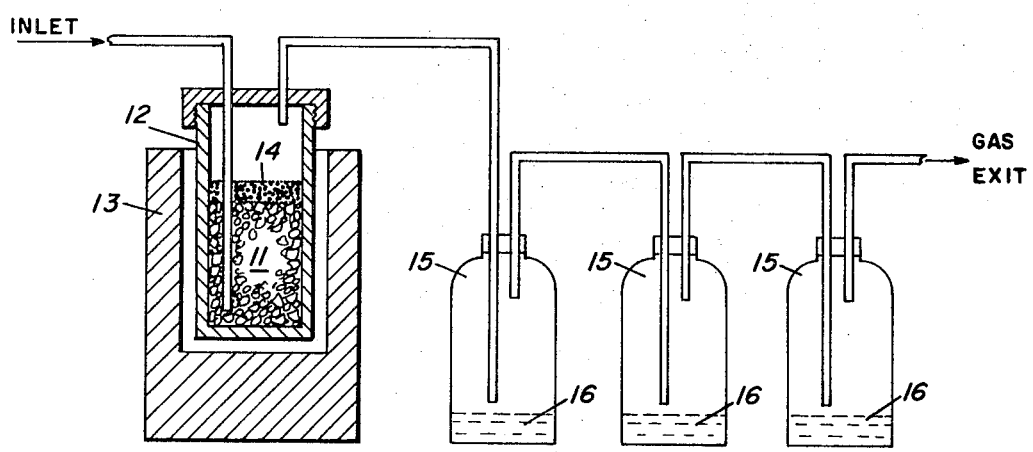

In this example a solid reductant, i.e., coke, was employed and the apparatus shown in FIG. 2 was utilized. A filtered sludge of the type used in Example 1 was wet mixed with sodium hydroxide for 1 hour at the boiling point in an open container, the mixture consisting of 34.5 g. dry weight of sludge, 3.45 g. metallurgical coke breeze, 27.6 g. NaOH, and 100 ml. water. The water was then evaporated to near dryness and dried at 250° C. for 4 hours. The dry material was broken up to about −4 mesh size and this charge (reference 11 in FIG. 2) was placed in an iron crucible 12 contained in electric crucible furnace 13 as shown in FIG. 2, dimensions of the crucible being 1½ inch I.D. × 6 inches long. On top of the charge mixture was spread an additional 3.45 g. metallurgical coke 14. Air was used as the gaseous medium in reduction-oxidation fuming in order that zinc metal might be vaporized, converted to ZnO, and entrained so as to pass through cold portions of the apparatus without adhering to the surfaces. The charge was heated to 1,000° C. for 1 hour with an air rate of approximately 400 cc./min. The fumed or entrained products were removed from the gas in the impingement system shown in FIG. 2. This consisted of 0.5 liter vessels 15 containing 40 ml. of a 0.25 percent solution of a surface-active agent in water 16.

The sintered products were removed from the crucible, reduced in size, and leached in hot water. Crystalline Na₂HPO₄ was recovered from the leach liquor. The metallic residue was separated in a wet magnetic separator into a magnetic fraction and a nonmagnetic fraction. Weight and analyses of the products are presented in Table 3.

TABLE 3.—COKE REDUCTION, SINTER OF AUTOMOTIVE SLUDGE

| Material | Wt. g. | Analysis, pct. | | | | | Distribution, pct. | | | | |
|---|---|---|---|---|---|---|---|---|---|---|---|
| | | Fe | Zn | Ni | PO₄ | Na | Fe | Zn | Ni | PO₄ | Na |
| Magnetic leach residue | 10.65 | 69.7 | 2.9 | 3.3 | 0.4 | | 82.1 | 13.8 | 88.7 | 0.2 | |
| Nonmagnetic leach residue | 5.44 | 28.8 | 19.9 | .8 | 3.6 | | 17.3 | 48.5 | 11.0 | 1.2 | |
| Fumed ZnO | 1.33 | 4.1 | 63.2 | .1 | | | .6 | 37.7 | .3 | | |
| Na₂HPO₄.XH₂O | 58.3 | | | | 27.7 | 13.0 | | | | 98.3 | 94.7 |
| Mother liquor | ¹1.86 | | | | 2.2 | 22.8 | | | | .3 | 5.3 |
| Total | 77.58 | | | | | | 100.0 | 100.0 | 100.0 | 100.0 | 100.0 |

¹ Estimated for solids in solution.

The apparatus used in the above examples is not an essential aspect of the invention and many possible modifications and substitutions will be apparent to those skilled in the art.

We claim:

1. A process for recovery of metals comprising iron and zinc from waste phosphate sludge comprising (1) mixing the sludge with an amount of an aqueous alkali solution that is approximately the stoichiometric amount to react with phosphate present in the sludge, (2) drying the mixture and sintering at a temperature of about 500° to 1300° C. in the presence of a reductant, whereby the phosphate in the sludge is converted to a water-soluble phosphate, the metals are reduced to the metallic state and the resulting metallic zinc is volatilized from the reaction zone and (3) leaching the sinter cake with water to recover the soluble phosphate and liberate the reduced iron or mixture of iron and other metals in the sludge.

2. The process of claim 1 in which the alkali is sodium hydroxide.

3. The process of claim 1 in which the reductant is gaseous.

4. The process of claim 3 in which the reductant is carbon monoxide.

5. The process of claim 1 in which the reductant is a solid.

6. The process of claim 5 in which the reductant is coke.

* * * * *